United States Patent
Iijima

(10) Patent No.: US 6,573,763 B2
(45) Date of Patent: Jun. 3, 2003

(54) WAVEFORM GENERATION APPARATUS AND WAVEFORM GENERATION METHOD

(75) Inventor: Yukio Iijima, Ikoma (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/141,777

(22) Filed: May 10, 2002

(65) Prior Publication Data

US 2002/0167345 A1 Nov. 14, 2002

(30) Foreign Application Priority Data

May 11, 2001 (JP) ...................................... 2001-142232

(51) Int. Cl.$^7$ ............................................. H03B 21/00
(52) U.S. Cl. ...................... 327/107; 327/100; 327/165; 327/299
(58) Field of Search ................................ 327/107, 100, 327/113, 114, 141, 146, 149, 153, 154, 155, 158, 159, 161, 165, 166, 291, 293, 294, 299

(56) References Cited

U.S. PATENT DOCUMENTS

| | | | | |
|---|---|---|---|---|
| 3,962,647 A | * | 6/1976 | Richman | 327/160 |
| 4,310,802 A | * | 1/1982 | Ichimiya et al. | 327/25 |
| 4,368,434 A | * | 1/1983 | Miller et al. | 329/336 |
| 5,502,499 A | * | 3/1996 | Birch et al. | 348/523 |
| 5,818,889 A | * | 10/1998 | Cook | 375/364 |

FOREIGN PATENT DOCUMENTS

JP   11-232651   8/1999

* cited by examiner

Primary Examiner—Kenneth B. Wells
Assistant Examiner—Hai L. Nguyen
(74) Attorney, Agent, or Firm—Parkhurst & Wendel, L.L.P.

(57) ABSTRACT

A waveform generation apparatus comprises a delay circuit comprising i pieces of unit delay circuits connected in series, and providing i kinds of delay states by deriving signals from the respective unit delay circuits; k pieces of selection circuits each selecting one delay state from among the i kinds of delay states; a waveform generation circuit for generating n pieces of binary state signals in the same state, or generating n pieces of binary-state signals having a shape according to recording data supplied from the outside, on the basis of the signals having the i kinds of delay states; a transmission path for transmitting the n pieces of binary-state signals generated by the waveform generation circuit; a waveform synthesis circuit for generating a signal having multi-valued information from the n pieces of binary-state signals transmitted through the transmission path; a phase difference detection circuit for detecting phase differences among the n pieces of binary-state signals in the same state, when the n pieces of binary-state signals in the same state are transmitted through the transmission path; and an offset control circuit for controlling the k pieces of selection circuit on the basis of phase difference information from the phase difference detection circuit, and adding offset values to target delays, thereby to eliminate the phase differences among the signals in the transmission circuit.

14 Claims, 14 Drawing Sheets error in composite waveform
due to skew in transmission signal C

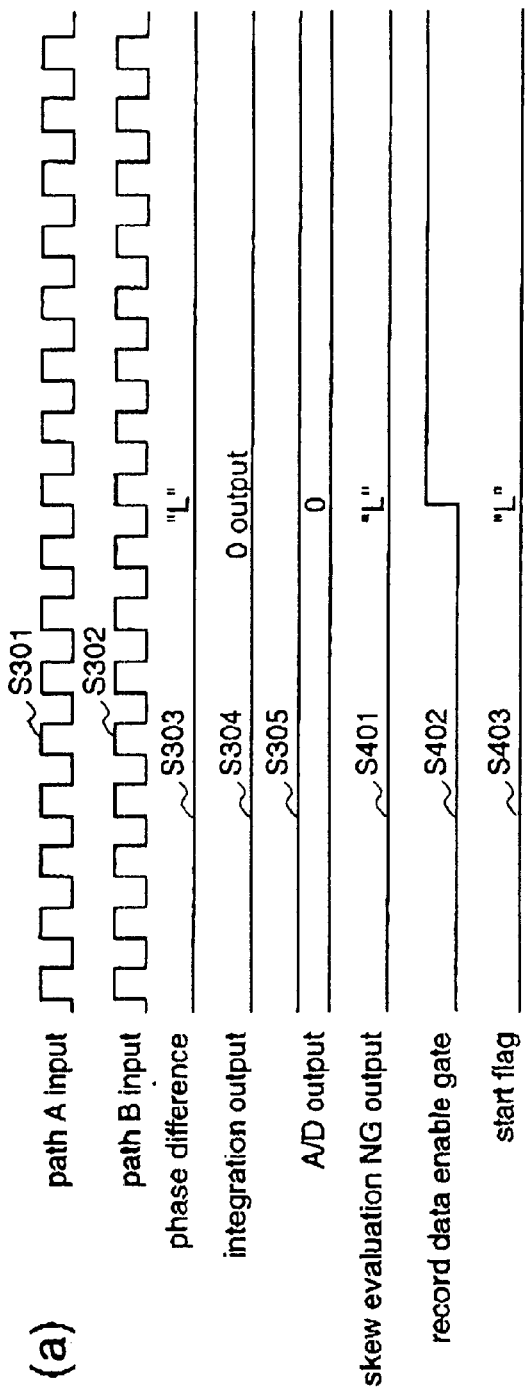
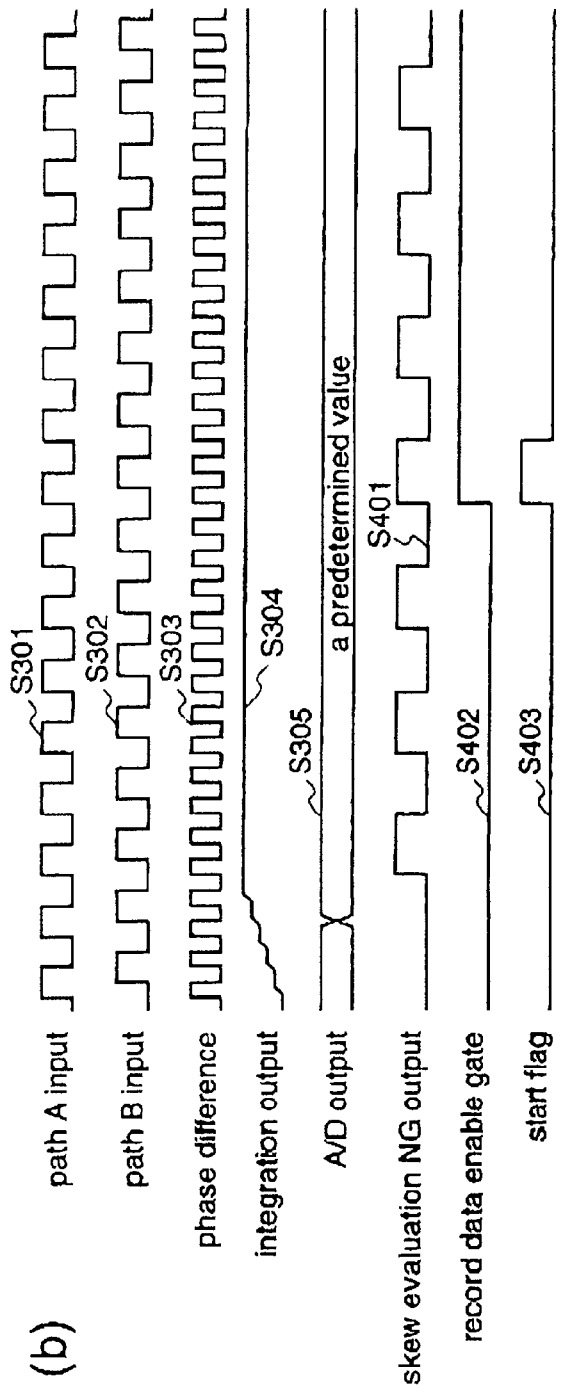
Fig.12 (a)
Fig.12 (b)

WAVEFORM GENERATION APPARATUS AND WAVEFORM GENERATION METHOD

FIELD OF THE INVENTION

The present invention relates to a waveform generation apparatus and method for generating, transmitting, and synthesizing plural binary-state signals to generate a multi-valued composite signal and, more particularly, to a waveform generation apparatus having a construction for eliminating an adverse effect of phase differences among the plural binary-state signals on the multi-valued composite signal.

BACKGROUND OF THE INVENTION

In recent years, high-density recording on recording media has been demanded for an increase in recording capacity, and an improved accuracy of waveform generation has been demanded of waveform generation apparatuses for an increase in recording density.

FIG. 13 is a block diagram illustrating the construction of a conventional waveform generation apparatus. The conventional waveform generation apparatus is provided with a delay circuit 501 comprising plural stages of delay elements which are connected in series; plural (k pieces of) selectors 502-1~502-k for selecting the outputs from the respective output stages of the delay elements constituting the delay circuit 501; a waveform generation circuit 504 for receiving the outputs from the plural selectors; a transmission path 505 for transmitting the outputs from the waveform generation circuit 504; a waveform synthesis circuit 506 for synthesizing the waveforms of the signals transmitted through the transmission path 505; and plural (k pieces of) selector control circuits 507-1~507-k for controlling the operations of the respective selectors.

Hereinafter, the operation of the conventional waveform generation apparatus constructed as described above will be described.

When a recording/playback medium such as an optical disc is continuously irradiated with a laser beam for the duration of forming recording marks on the medium, heat generated by the irradiation with the laser beam stays on the medium, and the recording marks become larger with time, resulting in tear-drop-shaped marks as shown in FIG. 14. Thus, the recording/playback medium has a problem caused by the physical phenomenon on the medium.

If data are written on the recording/playback medium in which the problem caused by the physical phenomenon remains, the data cannot be read normally when the medium is played back. Therefore, it becomes necessary to generate a recording waveform so as to correct the physical phenomenon at recording. In the case of an optical disc, for example, a recording waveform is generated so as to frequently turn on and off a laser beam. Thus, it is necessary to generate a recording waveform for correction suited to each recording medium.

When generating such recording waveform for correcting the physical characteristics of a recording medium it becomes necessary to generate reference timings (reference clocks for recording correction) which are finer than a reference clock for writing.

In order to generate reference clocks for recording correction, delayed clocks are generated by delaying a reference clock with the delay circuit 501, and timings corresponding to the delay amounts are generated. Which delayed clock (delay amount) among the delayed clocks generated in the delay circuit 501 is to be adopted depends on the select state of each of the k pieces of selectors 502-1~502-k.

The waveform generation circuit 504 generates plural recording waveforms having different binary states, using the selected clocks having different delay amounts, according to input data. The recording waveforms having different binary states are transmitted through the transmission path 505. The waveform synthesis circuit 506 synthesizes binary-state signals corresponding to three recording waveforms among the transmitted recording waveforms having different binary states, thereby forming a multi-valued signal for recording. The multi-valued signal is transmitted to a laser diode (not shown) in the subsequent stage, whereby the laser diode is driven and data writing is carried out The reason why the multi-valued signal is not directly transmitted to the transmission path 505 is because data transmission errors due to noise are increased if multi-valued signal is transmitted through the path 505. So, the binary data (binary-state signals) are transmitted through the path 505 to reduce the errors due to noise. Furthermore, the selector control circuits 507-1~507-k control the respective selectors 502-1~502-k so as to select the delay amounts according to the setting of waveform generation.

In the conventional waveform generation apparatus constructed as described above, the paths of the respective binary-state signals up to the waveform synthesis circuit 506 will vary, when the signals from the delay circuit 501 are trasmitted through the respective selectors 502-1~502-k, the waveform generation circuit 504, and the transmission path 505, to the waveform synthesis circuit 506, resulting in skews among the signals. Therefore, it is necessary to adjust the lengths of the respective paths or the numbers of circuits through which the respective signals pass, thereby to minimize the skews.

Even when the transmission paths or the like are adjusted to minimize the skews, the delay amounts in the respective paths or circuits may vary due to the temperature, voltage, passage of time, or the like, and the variations appear as skews. These skews among the respective signals cause errors in the recording waveforms even though the signal inputs to the waveform generation circuit 504 are accurately controlled using the delay circuit 501 as shown in FIG. 13, resulting in errors in th recording marks.

In the conventional waveform generation apparatus and method constructed as described above, although the highly-accurate clocks are inputted to the waveform generation circuit 504 by using the delay circuit 501 and the selectors 502-1~502-k, skews are generated due to factors such as the signal transmission paths, use environment, passage of time, and the like, resulting in errors in recording waveforms.

SUMMARY OF THE INVENTION

The present invention is made to solve the above-mentioned problems and has for its object to provide a waveform generation apparatus and method which can reduce errors in recording waveforms due to skews among binary-state signals.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a waveform generation apparatus for transmitting in pieces of binary-state signals, and generating a signal waveform having a multi-valued state by synthesizing the n pieces of binary-state signals, which apparatus comprises: a delay means comprising i pieces of unit delay circuits connected in series, and providing i kinds of delay states by deriving signals from the respective unit delay circuits; k pieces of selection means each selecting one delay state from among the kinds of delay states of the delay means; a waveform generation means for generating n pieces of binary-state signals in the same state, or generating n pieces of binary-state signals having a shape according to recording data supplied from the outside, on the basis of the signals having the i kinds of delay states, which are outputted from the k pieces of selection means, and the recording data supplied from the outside; a transmission means for transmitting the n pieces of binary-state signals generated by the waveform generation means; a waveform synthesis means for generating a signal having multi-valued information from the n pieces of binary-state signals transmitted by the transmission means; a phase difference detection means for detecting phase differences among the n pieces of binary-state signals in the same state, when the n pieces of binary-state signals in the same state are transmitted through the transmission means; and an offset control means for controlling the k pieces of selection means on the basis of phase difference information from the phase difference detection means, and adding offset values to target delays, thereby to eliminate the phase differences among the signals in the transmission means. Therefore, with respect to transmission of the n pieces of binary-state signals, skews among the respective signals can be controlled and absorbed as offsets of the delay means, thereby improving composition accuracy of a composite waveform which is generated from the n pieces of binary-state signals.

According to a second aspect of the present invention, in the waveform generation apparatus according to the first aspect, the phase difference detection means comprises: a most delayed signal detection means for detecting a signal which is transmitted most lately, from among the n pieces of binary-state signals transmitted by the transmission means; a state storage means for storing the result of the detection by the most delayed signal detection means; and a delay amount calculation means for calculating a difference in delay amounts between the most-lately transmitted signal stored in the state storage means and another signal. Therefore, skews among the n pieces of binary-state signals can be reduced by detecting a signal which is transmitted most lately from among the n pieces of binary-state signals, and setting an offset delay of another signal to the latest signal, thereby improving composition accuracy of a composite waveform which is generated from the n pieces of binary-state signals.

According to a third aspect of the present invention, in the waveform generation apparatus according to the first aspect, the waveform generation means generates the n pieces of binary-state signals on the basis of the k pieces of signals selected by the selection means, and the input data; and the offset control means comprises: a path switching means for successively selecting all paths in the waveform generation means, through which the k pieces of signals selected by the selection means and the input data are transmitted; and a path offset storage means for holding offset information when the path switching means selects a path. Therefore, skews among the n pieces of binary state signals can be adjusted in all of the waveform generation modes, whereby composition accuracy of a composite signal generated from the n pieces of binary-state signals can be improved in all of the waveform generation modes.

According to a fourth aspect of the present invention, in the waveform generation apparatus according to the first aspect, the offset control means comprises: a unit delay amount calculation means for calculating a delay amount for each stage of unit delay circuit of the delay means; and an offset conversion means for converting the difference in delay amounts which is obtained by the phase difference detection means, into an offset value of the selection means, on the basis of the delay amount for each stage of unit delay circuit, which is obtained by the unit delay calculation means. Therefore, the offset control means can calculate as to which of the outputs from the i stages of delay means is to be employed by the selection means in the calculation of the delay amount per stage of delay means, whereby the selection of the selection means is facilitated, and composition accuracy of a composite waveform is improved.

According to a fifth aspect of the present invention, the waveform generation apparatus according to the first aspect further comprises a clock signal generation means for generating predetermined clock signals; the waveform generation means continuously receives two clock signals generated by the clock signal generation means, and outputs the clock signals to the transmission means; and the phase difference detection means detects phase differences among the n pieces of binary-state signals in the same state, and a phase difference between the continuously inputted two clock signals. Therefore, with respect to transmission of the n pieces of binary-state signals, skews among the respective signals can be controlled and absorbed as offsets of the delay circuit, and decision as to whether the offset control should be carried out or not is implemented by continuously detecting a skew between the two clock signals which are transmitted through the transmission path, whereby the frequency of skew correction is increased, and composition accuracy of a composite signal generated from the n pieces of binary-state signals is improved.

According to a sixth aspect of the present invention, in the waveform generation apparatus according to the fifth aspect, the waveform generation means is provided with a waveform generation state detection means for detecting a state where there is no data input and no waveform generation should be carried out. Therefore, offset correction is executed automatically, whereby the frequency of skew correction is increased, and composition accuracy of a composite waveform generated from the n pieces of binary-state signals is improved.

According to a seventh aspect of the present invention, in the waveform generation apparatus according to a fifth aspect, the offset control means is provided with a phase difference level detection means for detecting that the phase difference between the continuously-transmitted two clock signals becomes larger than a predetermined value; and when the offset control means receives a signal indicating that the state where no waveform generation should be performed is detected, from the waveform generation state detection means, and a signal indicating that the phase difference becomes larger than the predetermined value, the offset control means performs the process of adding offset values to target delays. Therefore, skew correction can be automatically carried out while continuously checking as to whether skew differences in the transmission path are caused by temperature or voltage, whereby the frequency of skew correction is increased, and composition accuracy of a composite waveform generated from the n pieces of binary-state signals is improved.

According to an eighth aspect of the present invention, there is provided a waveform generation method for transmitting n pieces of binary-state signals, and generating a signal waveform having a multi-valued state by synthesizing the n pieces of binary-state signals, which method comprises: a delay step of deriving signals from arbitrary number of stages of unit delay circuits which are connected in series, and outputting signals having i kinds of delay states; a selection step of selecting predetermined delay states from among the i kinds of delay states; a waveform generation step of generating n pieces of binary-state signals, on the basis of the signals having the predetermined delay states which are selected from among the i kinds of delay states, and data input; a transmission step of transmitting the n pieces of binary-state signals generated in the waveform generation step, onto a transmission path; a waveform synthesis step of generating a signal having multi-valued information, from the n pieces of binary-state signals generated in the waveform generation step and then transmitted; a step of outputting signals in the same state as n pieces of binary-state signals; a phase difference detection step of detecting phase differences among the n pieces of binary-state signals in the same state, when the n pieces of binary-state signals in the same state are transmitted through the transmission step; and an offset control step of controlling the number of delay stages in the delay step on the basis of phase difference information from the phase difference detection step, and adding offset values to target delays, thereby to eliminate the phase differences among the signals in the transmission step. Therefore, with respect to transmission of the n pieces of binary-state signals, skews among the respective signals can be controlled and absorbed as offsets in the delay step, thereby improving composition accuracy of a composite waveform which is generated from the n pieces of binary-state signals.

According to a ninth aspect of the present invention, in the waveform generation method according to the eighth aspect, the phase difference detection step includes: a most delayed signal detection step of detecting a signal which is transmitted most lately, from among the n pieces of binary-state signals transmitted in the transmission step; a state storage step of storing the result of the detection in the most delayed signal detection step; and a delay amount calculation step of calculating a difference in delay amounts between the most-lately transmitted signal stored in the state storage step and another signal. Therefore, skews among the n pieces of binary-state signals can be reduced by detecting a signal which is transmitted most lately from among the n pieces of binary-state signals, and setting an offset delay of another signal to the latest signal, thereby improving composition accuracy of a composite waveform which is generated from the n pieces of binary-state signals.

According to a tenth aspect of the present invention, in the waveform generation method according to the eighth aspect, in the waveform generation step, the n pieces of binary-state signals are generated on the basis of k pieces of signals selected in the selection step, and the input data; and the offset control step includes: a path switching step of successively selecting all paths in the waveform generation step, through which the k pieces of signals selected in the selection step and the input data are transmitted; and a path offset storage step of holding offset information when a path is selected in the path switching step. Therefore, skews among the n pieces of binary state signals can be adjusted in all of the waveform generation modes, whereby composition accuracy of a composite signal generated from the n pieces of binary-state signals can be improved in all of the waveform generation modes.

According to an eleventh aspect of the present invention, in the waveform generation method according to the eighth aspect, the offset control step includes: a unit delay amount calculation step of calculating a delay amount for each stage in the delay step; and an offset conversion step of converting the difference in delay amounts which is obtained in the phase difference detection step, into an offset value in the selection step, on the basis of the delay amount for each stage in the delay step, which is obtained in the unit delay calculation step. Therefore, the offset control step can calculate as to which of the outputs from the i stages of delay means is to be employed in the selection step for the calculation of the delay amount per stage of delay means, whereby the selection in the selection step is facilitated, and composition accuracy of a composite waveform is improved.

According to a twelfth aspect of the present invention, there is provided a waveform generation method for transmitting n pieces of binary-state signals, and generating a signal waveform having a multi-valued state by synthesizing the n pieces of binary-state signals, which method comprises: a delay step of deriving signals from arbitrary number of stages of unit delay circuits which are connected in series, and outputting signals having i kinds of delay states; a selection step of selecting predetermined delay states from among the i kinds of delay states; a waveform generation step of generating n pieces of binary-state signals, on the basis of the signals having the predetermined delay states which are selected from among the i kinds of delay states, and data input, and continuously transmitting two clock signals; a transmission step of transmitting the n pieces of binary-state signals generated in the waveform generation step, and the continuously supplied two clock signals, onto a transmission path; a waveform synthesis step of generating a signal having multi-valued information, from the n pieces of binary-state signals generated in the waveform generation step and then transmitted; a step of outputting signals in the same state as n pieces of binary-state signals; a phase difference detection step of detecting phase differences among the n pieces of binary-state signals in the same state, and detecting a phase difference between the continuously supplied two clock signals, when the n pieces of binary-state signals in the same state are transmitted through the transmission step; and an offset control step of controlling the number of delay stages in the delay step on the basis of phase difference information from the phase difference detection step, and adding offset values to target delays, thereby to eliminate the phase differences among the signals in the transmission step. Therefore, with respect to transmission of the n pieces of binary-state signals, skews among the respective signals can be controlled and absorbed as offsets in the delay step, and decision as to whether the offset control should be carried out or not is implemented by continuously detecting a skew between the two clock signals which are transmitted through the transmission path, whereby the frequency of skew correction is increased, and composition accuracy of a composite signal generated from the n pieces of binary-state signals is improved.

According to a thirteenth aspect of the present invention, in the waveform generation method according to the twelfth aspect, the waveform generation step includes a waveform generation state detection step of detecting a state where there is no data input and no waveform generation should be carried out. Therefore, offset correction is executed automatically, whereby the frequency of skew correction is increased, and composition accuracy of a composite waveform generated from the n pieces of binary-state signals is improved.

According to a fourteenth aspect of the present invention, in the waveform generation method according to the twelfth aspect, the offset control step includes: a phase difference level detection step of detecting that the phase difference between the continuously-transmitted two clock signals becomes larger than a predetermined value; and an adjustment decision step of detecting the state where no waveform generation should be performed, from the waveform generation state detection step in the waveform generation step, and adjusting the n pieces of binary-state signals. Therefore, skew correction can be automatically carried out while continuously checking as to whether skew differences in the transmission path are caused by temperature or voltage, whereby the frequency of skew correction is increased, and composition accuracy of a composite waveform generated from the n pieces of binary-state signals is improved.

BRIEF DESCRIPTION OF THE DRAWINGS

FIGS. 12(a) and 12(b) are diagrams for explaining the operation of the means for deciding the timing to automatically adjust the phase difference.

DETAILED DESCRIPTION OF THE PREFERRED EMBODIMENTS

[Embodiment 1]

Figure 1:
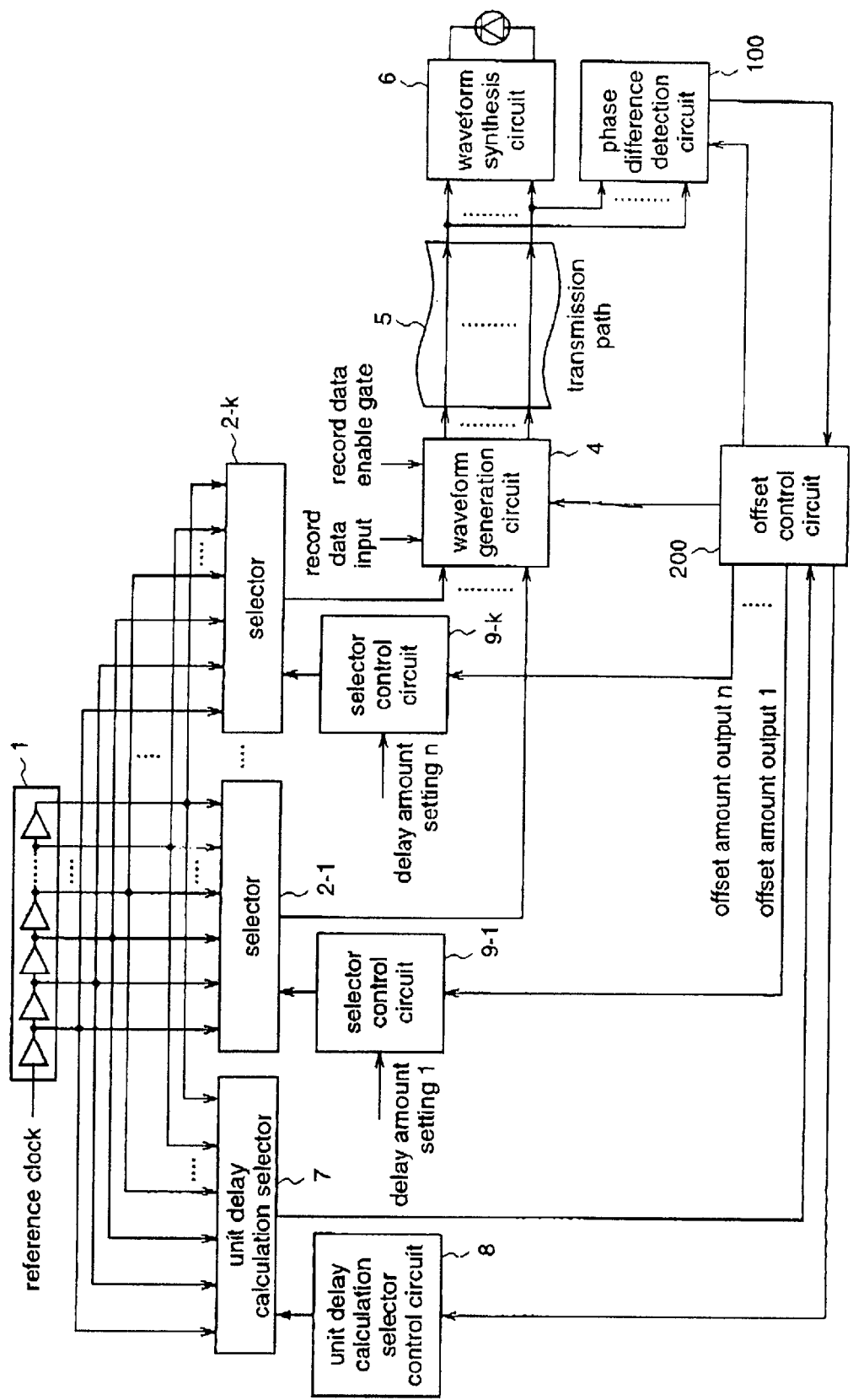
FIG. 1 is a block diagram illustrating the construction of a waveform generation apparatus according to a first embodiment of the present invention.

Hereinafter, a waveform generation apparatus according to a first embodiment of the present invention will be described. FIG. 1 is a block diagram illustrating the construction of a waveform generation circuit according to the first embodiment of the present invention. In FIG. 1, reference numeral 1 denotes a delay circuit for delaying a reference clock, which delay circuit comprises plural stages of delay elements such as inverters or buffers which are connected in series. Reference numerals 2-1~2-k denote k pieces of selectors each for selecting the delay output of any stage (delay element), from among the delay outputs of the respective delay elements constituting the delay circuit 1. Reference numeral 4 denotes a waveform generation circuit for generating n pieces of binary-state signals by using the k kinds of delay clocks obtained from the selectors 2-1~2-k. Reference numeral 5 denotes a transmission path for transmitting the n pieces of binary-state signals generated by the waveform generation circuit 4, and this transmission path 5 is made of a flexible print substrate or the like. Further, reference numeral 6 denotes a waveform synthesis circuit for synthesizing the n pieces of binary-state signals transmitted through the transmission path 5, thereby generating a multi-valued waveform.

Furthermore, reference numeral 100 denotes a phase difference detection circuit for detecting skews among the n pieces of binary-state signals which are transmitted through the transmission path 5. Reference numeral 200 denotes an offset control circuit for controlling selection of a path for waveform generation in the waveform generation circuit 4, and calculating, every time a path is selected, offset conditions in the selectors 2-1~2-k, on the basis of the result of the detection by the phase difference detection circuit 100, and a delay amount for each stage (each delay element) of the delay circuit 1, which is an output from a unit delay calculation selector 7 that is calculated by successively selecting a unit delay calculation selector control circuit 8. Further, reference numerals 9-1~9-k, denote selector control circuits for receiving the offset results of the offset control circuit 200, and giving the offsets to the predetermined set values of the respective selectors 2-1~2-k to control the selectors so that the respective paths have the same skew.

Hereinafter, the operation of the waveform generation apparatus so constructed will be described.

Initially, the delay circuit 1 delays the reference clock to generate timings (clocks) that are finer than the reference clock unit, and each of the selectors 2-1~2-k selects a clock having a desired delay from among the clocks delayed in the delay circuit 1. Using the outputs from the selectors 2-1~2-k, the waveform generation circuit 4 generates n pieces of binary-state signals (digital signals having only two states of 1 and 0), and outputs the binary-state signals to the transmission path 5. Then, the waveform composition circuit 6 synthesizes the binary-state signals transmitted through the transmission path 5 to generate a composite signal having multi-valued states.

The timings of the n pieces of (in this example, three) binary-state signals and the timing of the multi-valued composite signal will be described with reference to FIGS. 2(a) and 2(b).

Figure 2:
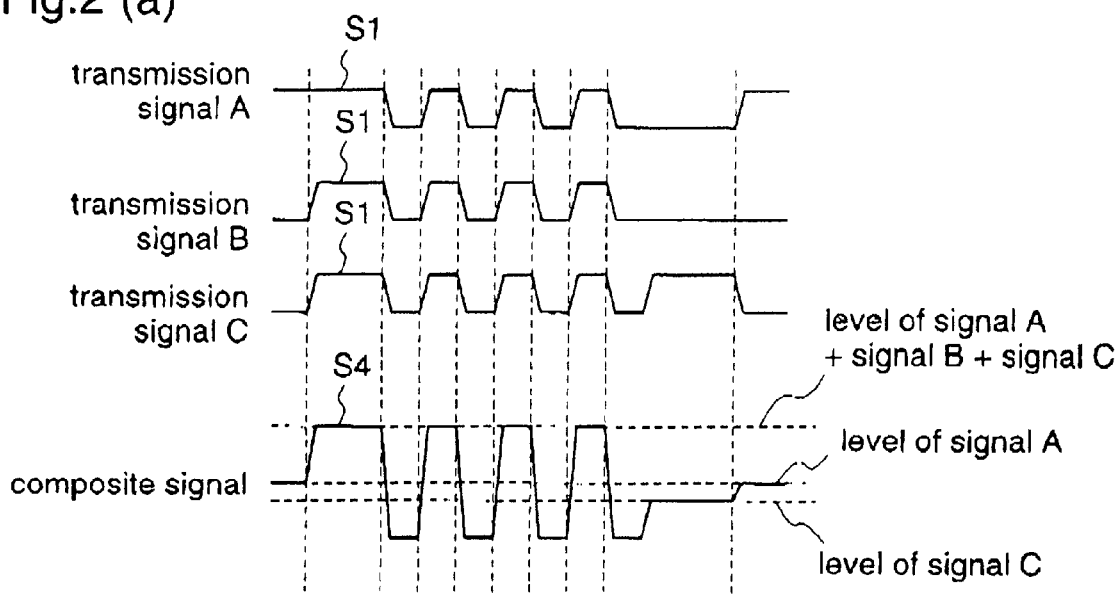
FIGS. 2(a) and 2(b) are diagrams illustrating waveform generation timings by the waveform generation apparatus according to the first embodiment.
Figure 2:
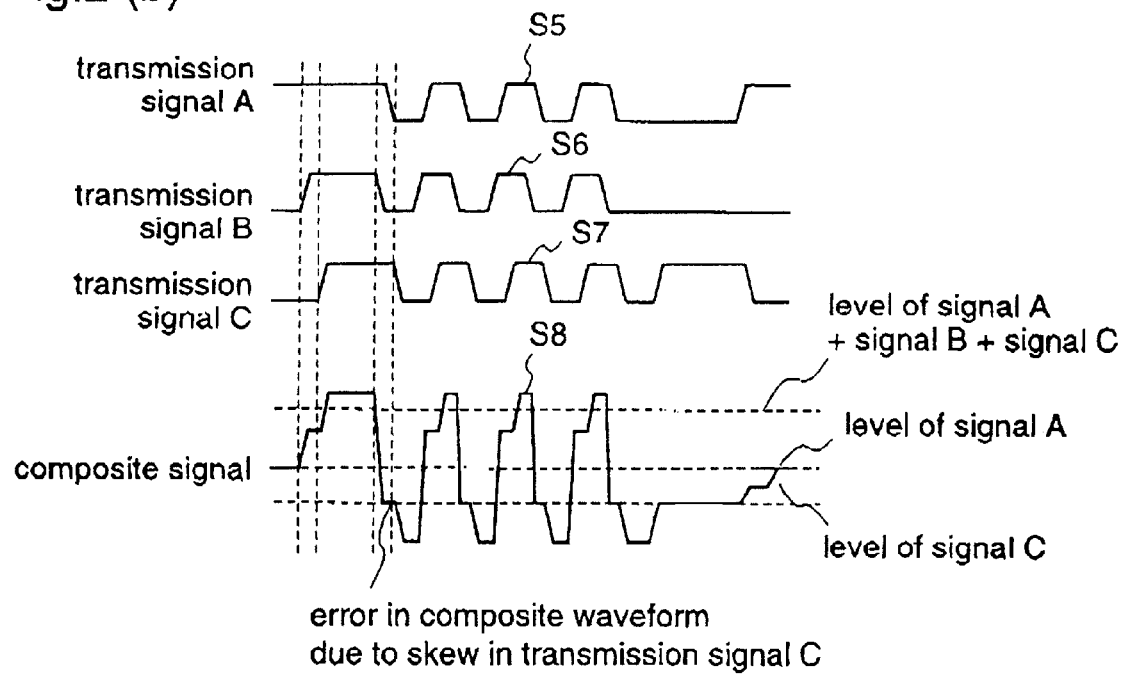

Initially, when there are no skews among a transmission signal A (S1), a transmission signal B (S2), and a transmission signal C (S3) as shown in FIG. 2(a), an original composite waveform output is obtained as a composite waveform (signal) S4. However, when skews occur among a transmission waveform A (S5), a transmission waveform B (S6), and a transmission waveform C (S7) as shown in FIG. 2(b), deviations of the respective waveforms caused by the skews appear as a deviation of a composite waveform (signal) S8, and the waveforms cannot be synthesized by the synthesis circuit 6 to obtain the original composite waveform S4 (refer to FIG. 2(a)).

Figure 3:
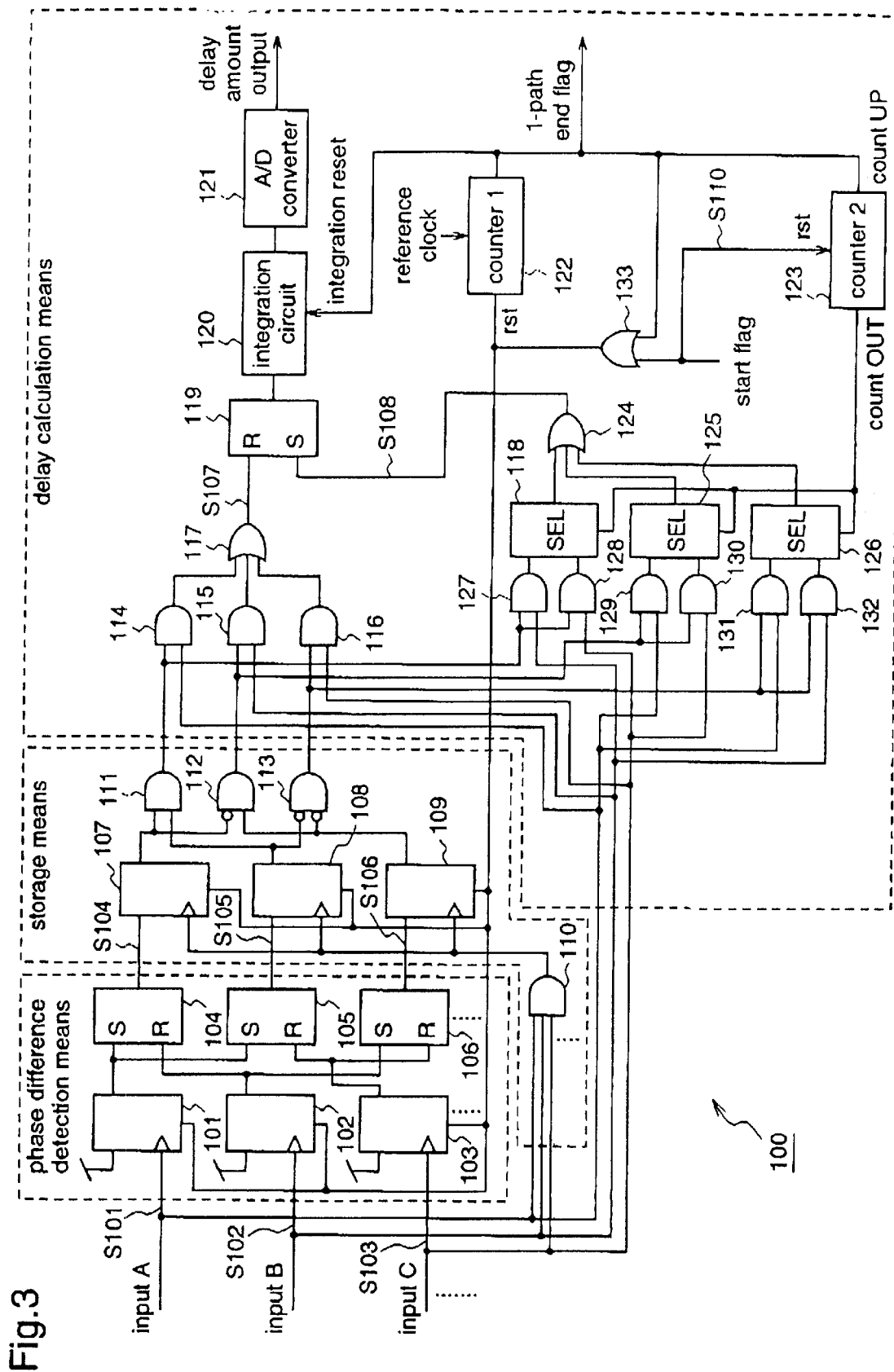
FIG. 3 is a block diagram illustrating the construction of a phase detection circuit as a constituent of the waveform generation apparatus according to the first embodiment.

With reference to FIG. 3, the phase detection circuit 100 shown in FIG. 1 is provided with a phase difference detection means comprising flip-flops 101, 102, 103, and SR latches 104, 105, 106; a storage means comprising flip-flops 107, 108, 109, and AND circuits 110, 111, 112, 113; and a delay calculation means comprising AND circuits 114, 115, 116, an OR circuit 117, selectors 118, 125, 126, an SR latch 119, an integration circuit 120, an A/D conversion circuit 121, counters 122 and 123, AND circuits 127, 128, 129, 130, 131, 132 which are connected to the input stages of the selectors 118, 125, and 126, and an OR circuit 133.

Figure 4:
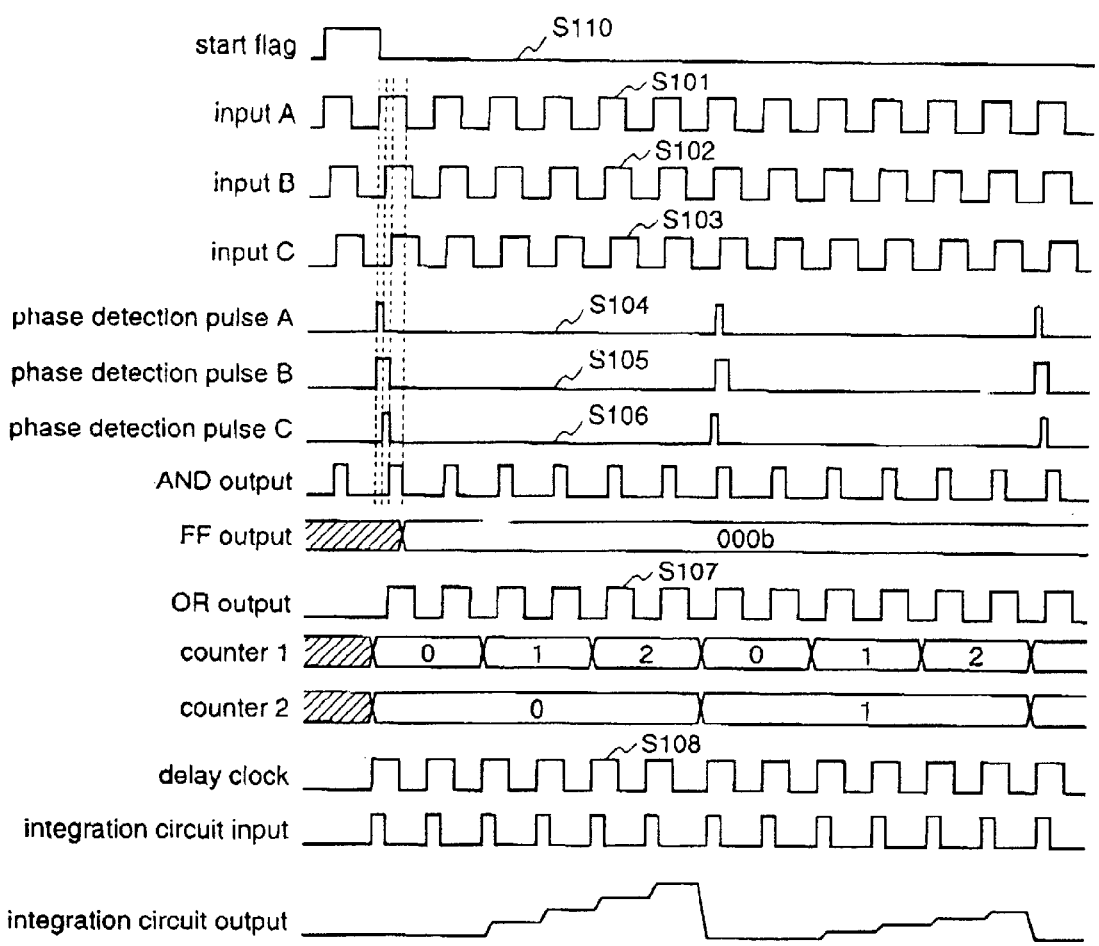
FIG. 4 is a timing chart for explaining the operation of the phase detection circuit.

The operation of the phase difference detection circuit 100 will be described with reference to FIG. 4. It is assumed that the number of input signals, among which phase differences are to be detected, is three. Furthermore, it is assumed that the delay relationships among an input A (S101), an input B (S102), and an input C (S103), which are inputted to the phase difference detection circuit 100, are as follows: the input B (S102) is later than the input A (S101), and the input C (S103) is later than the input B (S102).

Initially, when a start flag (a phase detection pulse A) S104 is inputted, the flip-flops 101, 102, 103, 107, 108, and 109 and the counters 122 and 123 are initialized to "0". After the initialization to "0", the output state of the flip-flop 101 changes from "0" to "1" when the rising edge of the input A (S101) is inputted. Likewise, the output state of the flip-flop 102 changes from "0" to "1" when the rising edge of the input B (S102) is inputted, and the output state of the flip-flop 103 changes from "0" to "1" when the rising edge of the input C (S103) is inputted.

The SR latch 104 outputs "1" (set) when the output of the flip-flop 101 becomes "1". Further, the SR latch 104 outputs "0" (reset) when the output of the flip-flop 102 becomes "1". Furthermore, when the "0" to "1" change of the output of the flip-flop 102 is later than that of the output of the flip-flop 101, the SR latch 104 outputs "0".

Likewise, the SR latch 105 outputs "0", as the "0" to "1" change of the output of the flip-flop 103 is later than that of the output of the flip-flop 101. Further, the SR latch 106 outputs "0", as the "0" to "1" change of the output of the flip-flop 103 is later than that of the output of the flip-flop 102.

Then AND circuit 110 generates an output when the input A (S101), the input B (S102), and the input C (S103) become "1". When the output of the AND circuit 110 becomes "1", the outputs of the SR latches 104, 105, and 106 have already been determined, and therefore, the respective outputs at this point of time are held by the subsequent flip-flops 107, 108, and 109, respectively. According to the results held by the flip-flops 107, 108, and 109, any of the subsequent AND circuits 111, 112, and 113 becomes "1" while the other two AND circuits remain at "0".

Since it is now premised that the input C (S103) is the latest input, only the output of the AND circuit 113 becomes "1", and only the AND circuit 116 among the subsequent AND circuits 114, 115, and 116 becomes effective, and the OR circuit 117 outputs the input C (S103) as an output S107.

The counter 1 (122) counts the time required for delay calculation by using a reference clock. Further, the counter 2 (123) counts the number of input lines, and the selector 118 is controlled by the count of the counter 2 (123), whereby the output of the selector 118 to the OR circuit 124 is switched between a most delayed signal (signal having the largest amount of delay) and an input to be compared with the most delayed signal. When the count of the counter 2 (123) is "1", the selector 118 outputs the input A (S101) to the OR circuit 124, and this signal is compared with the input C (S103) which is the most delayed signal, by the SR latch 119, and a phase difference between the input A (S101) and the input C (S103) becomes the output of the SR latch 119. The value to be integrated by and outputted from the integration circuit 120 varies depending on the output pulse width of the SR latch 119, and the value is converted into a digital signal value in commensurate with the amount of integration by the A/D conversion circuit 121.

The larger the phase difference is, the larger the amount of integration in the integration circuit 120 becomes, and the larger the output value from the A/D conversion circuit 121 becomes. Further, the delay amounts of the input B (S102) and the input C (S103) are calculated in similar manner.

Since the phase difference detection circuit 100 is provided with the phase detection means, the storage means, and the delay calculation means, a signal having the largest delay (a most delayed signal) can be detected from among plural input signals, and a phase difference between the most delayed signal and the other input signal can be outputted as a digital value of a delay amount. Further, the offset control circuit 200 receives the delay amount outputted from the phase detection circuit 100, calculates an offset value, and performs feedback control on each selector, thereby controlling the waveform generation process of the waveform generation circuit 4.

Figure 5:
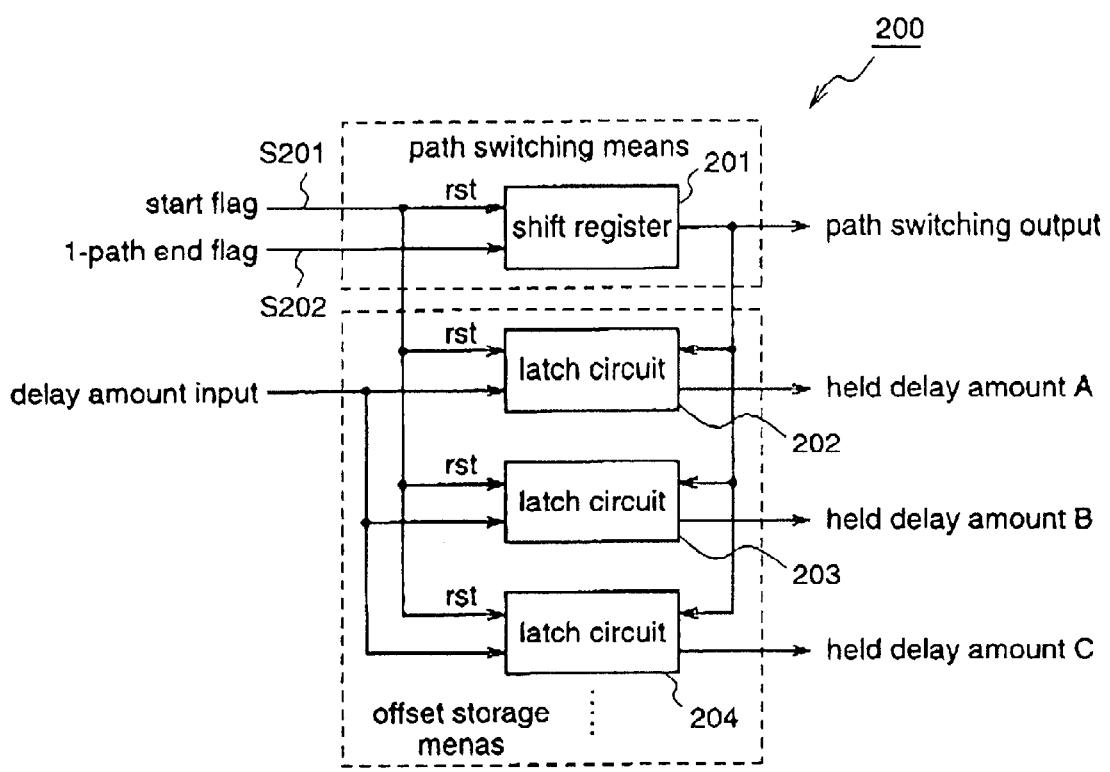
FIG. 5 is a block diagram illustrating the specific construction of an offset control circuit as a constituent of the waveform generation apparatus according to the first embodiment.
Figure 6:
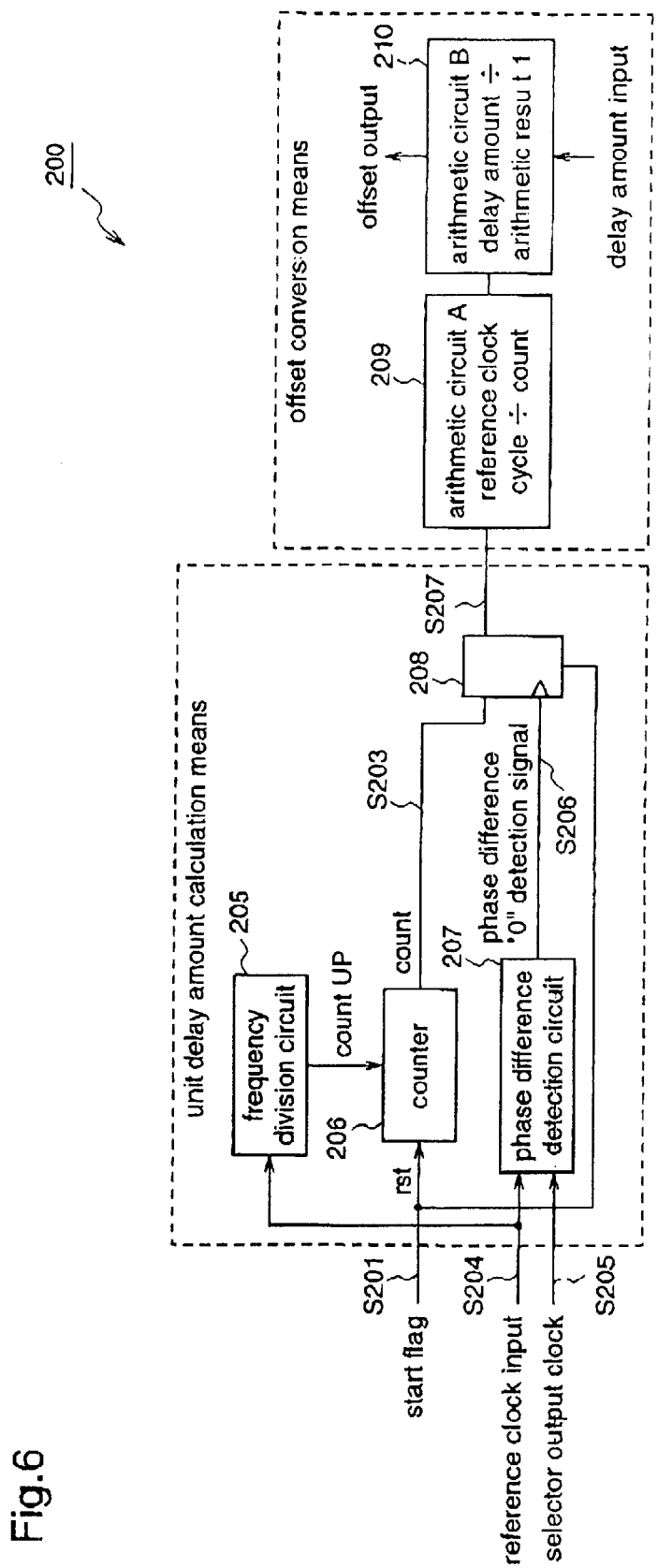
FIG. 6 is a block diagram illustrating the specific construction of an offset control circuit as a constituent of the waveform generation apparatus according to the first embodiment.

FIGS. 5 and 6 are block diagrams illustrating the specific constructions of a path switching means, an offset storage means, a unit delay amount calculation means, and an offset conversion means, which are constituents of the offset control circuit 200. With reference to FIG. 5, the offset control circuit 200 is constituted by a path switching means comprising a shift register (counter) 201, and an offset storage means comprising latch circuits 202~204 (three paths are shown in FIG. 5). The counter 201 is initialized to "0" with a start flag, and a first path selection signal S201 is outputted. Further, the counter 201 counts up with a 1-path end flag S202, thereby successively selecting the paths. The latch circuit 202 holds the delay amount when the first path is selected, and the counter 201 holds the delay amount when the path is changed from the first path to the second path. Likewise, each of the latch circuit 203 and the latch circuit 204 holds the delay amount of the corresponding path when the counter (shift register) 201 counts up, and the counter 201 holds the delay amount of each path while successively selecting the paths.

Further, with reference to FIG. 6, the count of a counter 206 which counts up with the output a frequency-division circuit 205 that frequency-divides the reference clock, is transmitted to the unit delay calculation selector control circuit 8, and the selector control circuit 8 controls selection of the unit delay calculation selector 7 according to the successive count-up of the counter 206.

The offset control circuit 200 shown in FIG. 6 comprises a unit delay amount calculation means, and an offset conversion means. The unit delay amount calculation means is provided with a phase difference detection circuit 207 for comparing the reference clock with a clock phase (selector output clock) which is selected by the unit delay calculation selector 7 from among the outputs of the delay circuit 1, and a flip-flop 208 for holding the count of the counter 206 when a phase difference "0" is detected. The offset conversion means is provided with an arithmetic circuit A (209) for calculating a delay amount per stage (delay element) of the delay circuit 1 by dividing the value of one cycle of the reference clock with the count, and an arithmetic circuit B (210) for dividing a held delay input which is detected as a skew difference from the arithmetic result of the arithmetic circuit A (209) with the arithmetic result of the arithmetic circuit A (209). The offset conversion means calculates as to which of the delay outputs from the plural stages of the delay circuit 1 is to be employed to make the skew difference (the delay amount) 0, and outputs the result as an offset of each path.

Plural arithmetic circuits B (210) as many as the number of the paths may be prepared for calculating the offset outputs on the basis of the delay amounts A, B, and C which are held by the latch circuits 202, 203, and 204, respectively. Alternatively, since the delay amounts are held by the latch circuits, the arithmetic processing may be carried out using a single arithmetic circuit B (210) by successively selecting the delay amounts.

Figure 7:
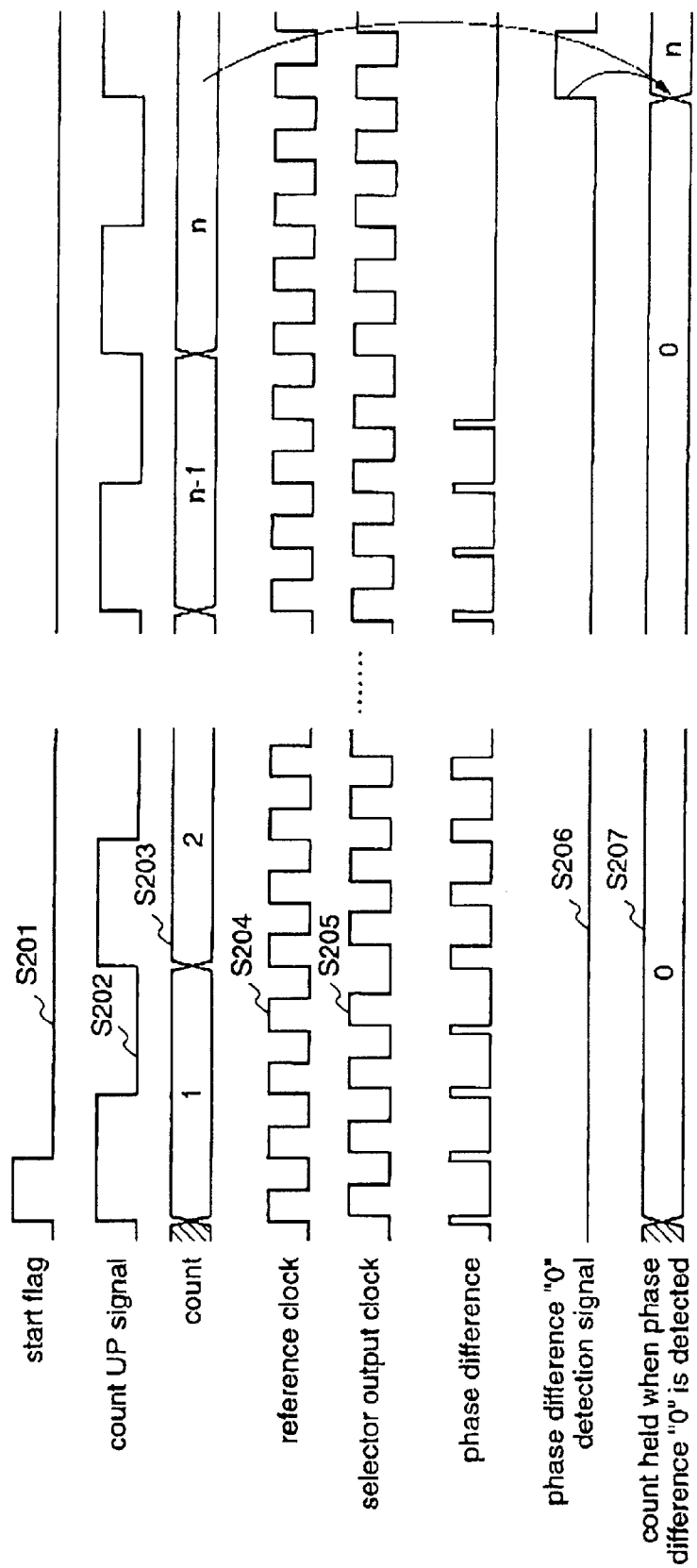
FIG. 7 is a timing chart for explaining the operation of a selector for unit delay amount calculation which is a constituent of the waveform generation apparatus according to the first embodiment.

Next, the operation of the unit delay amount calculation means will be described with reference to FIG. 7. Initially, when a start flag S201 is inputted, the counter 206 and the flip-flop 208 are reset. At this time, the count of the counter 206 indicates "1", and it is outputted to the unit delay calculation selector control circuit 8, whereby the unit delay calculation selector control circuit 8 controls the unit delay calculation selector 7 so that the output of the first-stage delay element in the delay circuit 1 is outputted as a selector output clock S205. Then, a phase difference between the selector output clock S205 and the reference clock S204 is detected by the phase difference detection circuit 207, whereby a delay for each stage of the delay elements constituting the delay circuit 1 is obtained as the phase difference.

When a count UP signal, which is obtained by frequency-dividing the reference clock S204, is inputted to the counter 206, the count S203 of the counter 206 changes from "1" to "2". When the count S203 becomes "2", the selector output clock S205 becomes a clock which is delayed from the reference clock by an amount equivalent to two stages of the delay circuit 1. Therefore, a delay amount for two stages of the delay circuit 1 is obtained as a phase difference between the reference clock S204 and the selector output clock S205.

In this way, while the counter 206 is successively counted up with the count UP signal S202 that is obtained by frequency-dividing the reference clock S204, there occurs a count S203 at which the phase difference between the reference clock S204 and the selector output clock S205 disappears in a certain stage (n-th stage) of the delay circuit 1. This is when the selector output clock S205 is delayed by one cycle with respect to the reference clock S204. A phase difference "0" detection signal S206 is outputted when the phase difference between the reference clock S204 and the selector output clock S205 becomes "0". Since the count S203 at which the phase difference is "0" is a delay for one cycle of the reference clock S204, this count S203 is held by the subsequent flip-flop 208 as a phase difference "0" detection count holding signal S207. Then, this signal S207 is inputted to the arithmetic circuit A (209). Since one cycle of the reference clock S204 is a fixed value, a delay amount per stage of the delay circuit 1 is obtained by performing an arithmetic of dividing the value of one cycle with the phase difference "0" detection count holding signal S207.

Although the delay amount per stage is obtained from the number of delay stages for one cycle, it may be obtained by detecting a phase difference between the reference clock S204 and a clock after a delay of one stage of the delay circuit 1.

Figure 8:
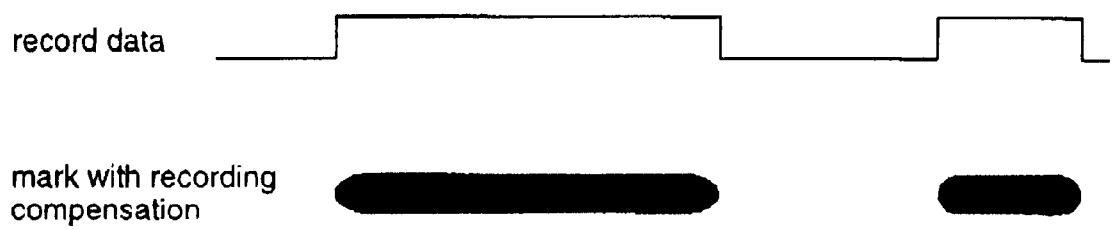
FIG. 8 is a diagram illustrating the state where data are recorded on a recording/playback medium using the waveform generation apparatus according to the first embodiment.
Figure 14:
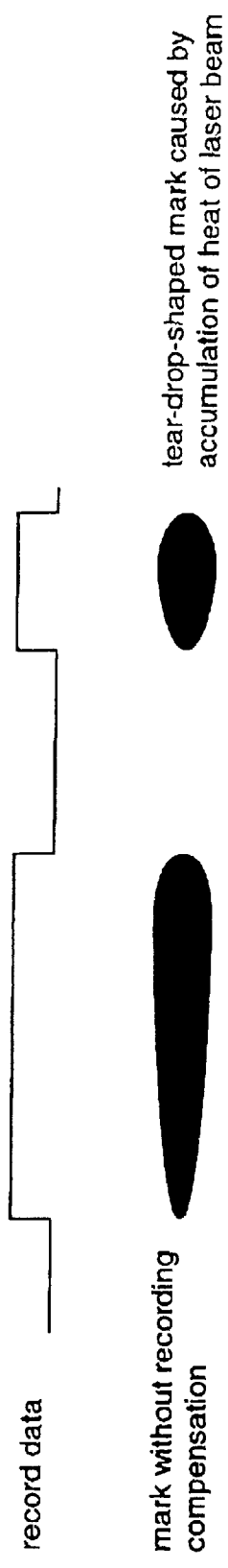
FIG. 14 is a diagram illustrating the state where data are recorded on a recording/playback medium using the conventional waveform generation apparatus.

Furthermore, highly-accurate waveform generation is realized by operating the respective constituents of the waveform generation apparatus when power is applied to the apparatus and, thereafter, at regular intervals, thereby to suppress skews among the transmission signals viewed from the end of the waveform composition circuit 6. FIG. 8 is a diagram illustrating the state where data are recorded on a recording/playback medium using the waveform generation apparatus (method) of this first embodiment, wherein no tear-drop-shaped mark as shown in FIG. 14 appears, which means that favorable recording is carried out.

As described above, according to the waveform generation circuit of the first embodiment, plural binary signals in the same condition and having no phase differences are outputted from the waveform generation circuit 4, and these signals are transmitted through the transmission path 5 and, thereafter, phase differences among these signals are detected by the phase difference detection circuit 100. Then, the output stages of the delay elements constituting the delay circuit 1 are selected by controlling the selector control circuits 9-1~9-k according to the degrees of the phase differences, and the selectors 2-1~2-k are feedback controlled so that offsets are set for targeted delay amounts. Thereby, the phase differences (skews) among the signals in the transmission path 5 are resolved, and the errors in the recording waveforms are also resolved. As a result, satisfactory recording marks can be formed on the recording/playback medium.

While in this first embodiment the detection means in the phase difference detection circuit 100 is constituted by the flip-flops 101, 102, 103, and the SR latches 104, 105, 106, a similar detection means may be implemented by another method.

Furthermore, while in this first embodiment the phase difference detection circuit 100 receives three input signals, it may receive n lines of input signals. Further, in this first embodiment, the detection means is constituted by the flip-flops 101, 102, 103, the SR latches 104, 105, 106; the storage means is constituted by the flip-flops 107, 108, 109, and the AND circuits 110, 111, 112, 113; and the delay calculation means is constituted by the AND circuits 114, 115, 116, the OR circuit 117, the selector 118, the SR latch 119, the integration circuit 120, the A/D converter 121, the counters 122, 123, the OR circuit 124, the selectors 125, 126, the AND circuits 127, 128, 129, 130, 131, 132, and the OR circuit 133. However, similar functions may be implemented by other methods.

Moreover, while in this first embodiment the offset control circuit 200 has three paths, it may has n lines of paths. Further, in this first embodiment, the path switching means is constituted by the shift register 201; the offset storage means is constituted by the latch circuits 202, 203, 204; the unit delay amount calculation means is constituted by the frequency-division circuit 205, the counter 206, the phase difference detection circuit 207, and the flip-flop 208; and the offset conversion means is constituted by the arithmetic circuits 209 and 210. However, similar functions may be implemented by other methods.

[Embodiment 2]

Figure 9:
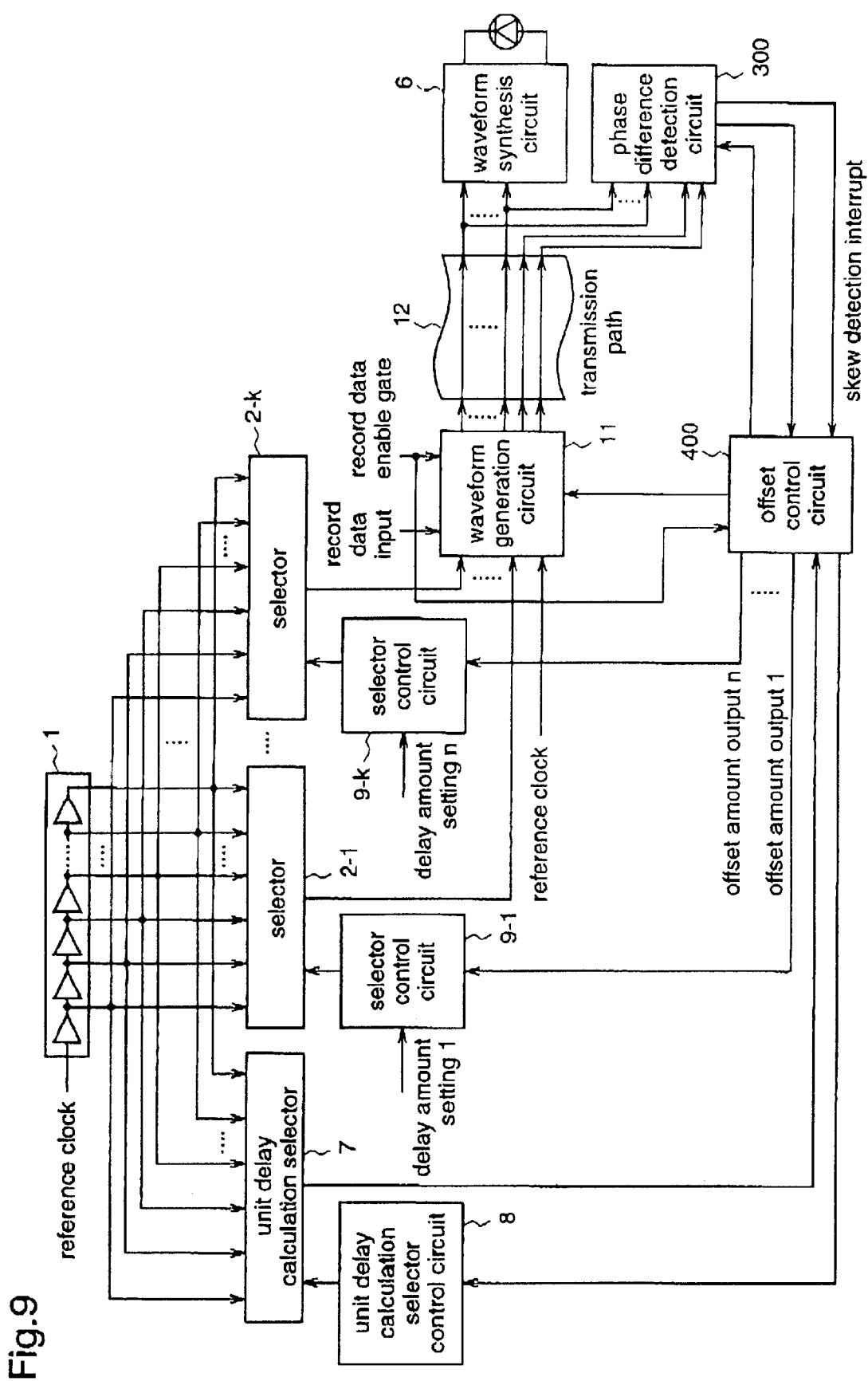
FIG. 9 is a block diagram illustrating the construction of a waveform generation apparatus according to a second embodiment of the present invention.

Hereinafter, a waveform generation apparatus according to a second embodiment of the present invention will be described. FIG. 9 is a block diagram illustrating the construction of a waveform generation apparatus according to the second embodiment. The waveform generation apparatus shown in FIG. 9 is different from the waveform generation apparatus according to the first embodiment shown in FIG. 1 only in the constructions of the waveform generation circuit, the transmission path, the phase difference detection circuit, and the offset control circuit.

To be specific, contrasted with the waveform generation circuit 4 according to the first embodiment, a waveform generation circuit 11 according to this second embodiment receives a reference clock, and has a mode of continuously outputting two lines of reference clocks even during waveform generation. The transmission path 12 has paths for transmitting the reference clocks continuously, aside from the transmission lines described for the first embodiment.

Figure 10:
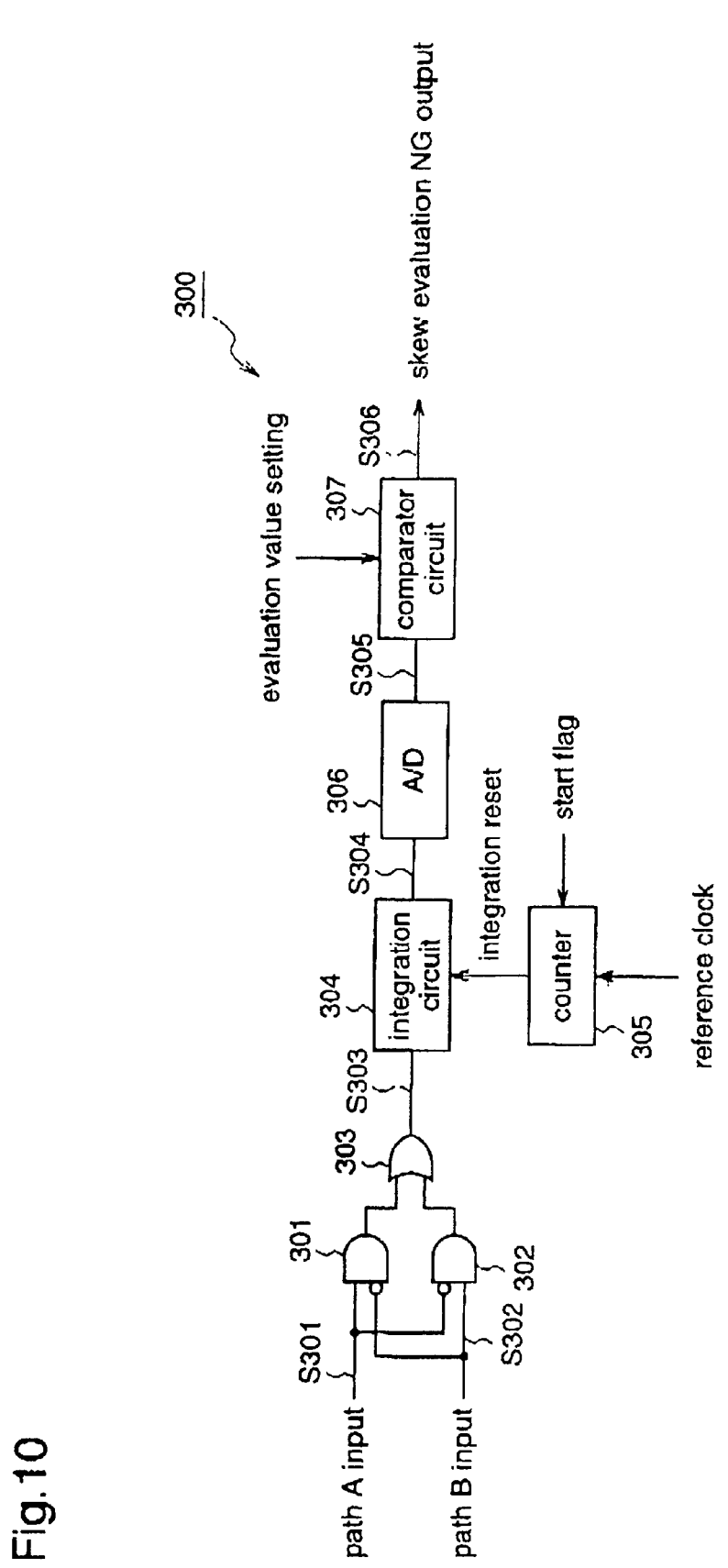
FIG. 10 is a block diagram illustrating the construction of a means for detecting the waveform generation state of an offset control circuit which is a constituent of the waveform generation apparatus according to the second embodiment.
Figure 11:
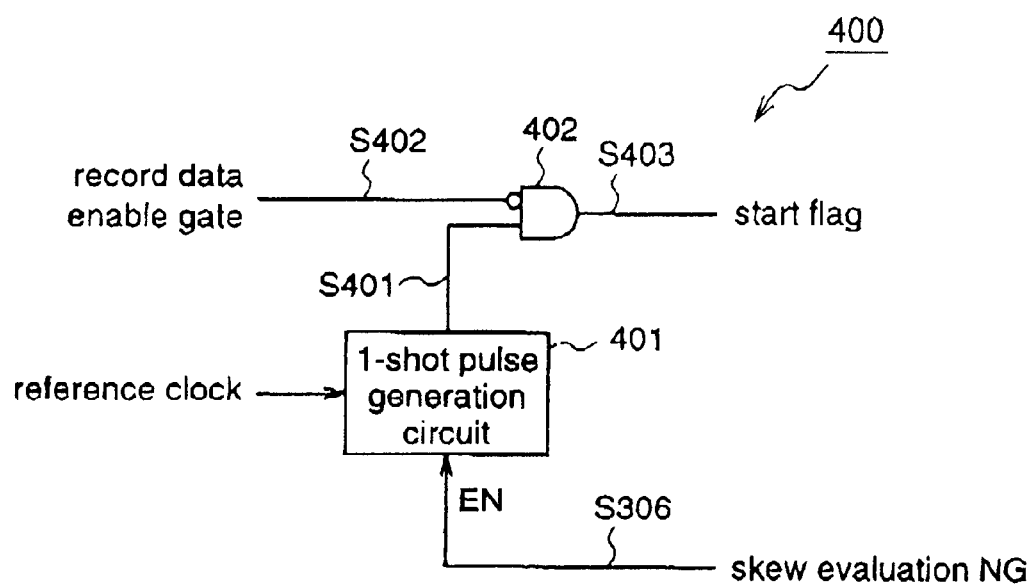
FIG. 11 is a block diagram illustrating the construction of a means for deciding a timing to automatically adjust a phase difference, which is included in the offset control circuit according to the second embodiment.
Figure 13:
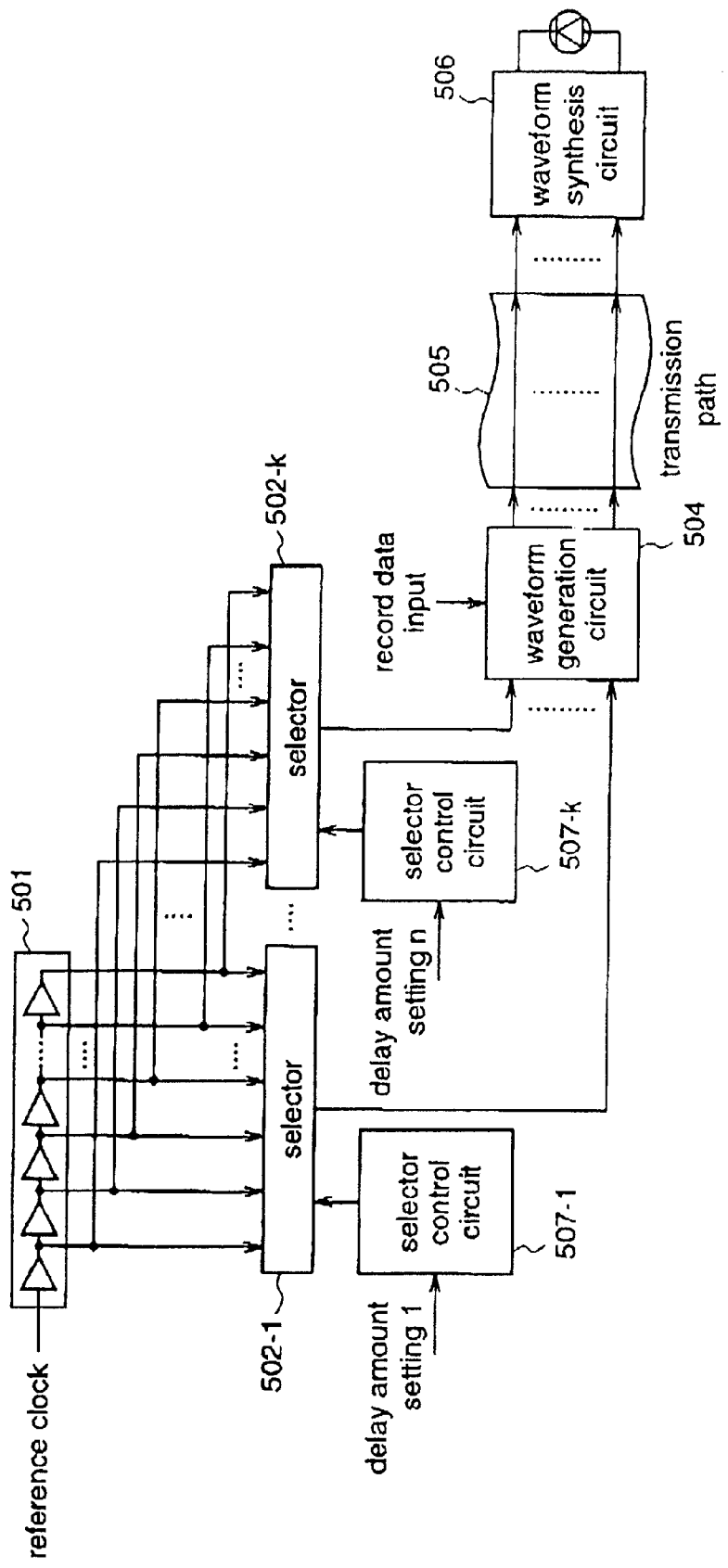
FIG. 13 is a block diagram illustrating the construction of a conventional data transfer apparatus (waveform generation apparatus).

Further, a phase difference detection circuit 300 according to the second embodiment is obtained by adding a construction shown in FIG. 10 to the construction of the phase difference detection circuit 100 according to the first embodiment. To be specific, AND circuits 301 and 302, an OR circuit 303, an integration circuit 304, a counter 305, an A/D conversion circuit 306, and an comparison circuit 307 are added. Further, an offset control circuit 400 according to the second embodiment is obtained by adding a construction shown in FIG. 11 to the construction of the offset control circuit 200 according to the first embodiment. To be specific, a 1-shot pulse generation circuit 401 and an AND circuit 402 are added.

Next, the operation of the waveform generation apparatus so constructed will be described.

The fundamental operations of the phase difference detection circuit 300 and the offset control circuit 400 are identical to the operations of the phase difference detection circuit 100 and the offset control circuit 200 according to the first embodiment and, therefore, only the operations of the constituents, which are added to the phase difference detection circuit 100 and the offset control circuit 200, will be described with reference to FIGS. 12(a) and 12(b).

Although the two reference clocks are continuously transmitted through the transmission path 12, when there is no skew difference between the path A (S301) and the path B (S302) for transmitting the reference clocks, the outputs of the AND circuits 301 and 302 are both "0", and the OR circuit output signal S303 is "L" as shown in FIG. 12(a). Since the input to the integration circuit 304 remains at "L", the integration circuit 304 does not perform integration, and outputs "0". Since the output S304 of the integration circuit 304 is "0", the output S305 of the A/D conversion circuit 306 remains at "0". Therefore, in the comparison circuit 307, the value does not increase until reaching an input evaluation value, so that the skew evaluation NG output S306 is fixed at "L". Therefore, the input to the 1-shot pulse generation circuit 401 is "L", and the output S401 from the 1-shot pulse generation circuit 401 is also "L", whereby the start flag S403 is fixed at "L", regardless of whether the recording data enable gate S402 is "H" or "L", and phase difference adjustment is not carried out.

On the other hand, when there is a skew difference between the path A (S301) and the path B (S302) for transmitting the supplied two reference clocks, both of the AND circuits 301 and 302 output pulses equivalent to the phase difference to the paths A and B, and further, the pulse equivalent to the phase difference is also outputted to the OR circuit output signal S303. Therefore, the integration circuit 304 repeats the integrating operation by the number of input pulses, whereby the output S304 from the integration circuit 304 increases from "0" in order. The counter 305 controls the integration circuit 304 so as to repeat the integrating operation in every predetermined period of time. The counter 305 operates in the free-run state, and resets the integrating operation when the count becomes "0". The reason why the integrating operation is carried out in every predetermined period is as follows. If there is a long period (section) where the skew difference is very little, the integration circuit 304 operates continuously to reach the above-mentioned evaluation value, resulting in malfunction. In order to avoid such malfunction, counting is carried out in every predetermined period.

As the integrating operation proceeds within the predetermined period counted by the counter 305, the integration circuit output S304 increases, and the value of the A/D conversion output S305 also increases from "0". When the A/D conversion circuit output S305 becomes larger than the set evaluation value, the comparison circuit 301 continues to output the skew evaluation NG output S306.

Then, the 3-shot pulse generation circuit 401, to which the skew evaluation NG output S306 is applied, continues to output the 1-shot pulse generation circuit output S401, which is a 1-shot pulse, to the AND circuit 402. However, when the recording data enable gate S402 is "L", the waveform generation circuit 11 performs the normal waveform generation and, therefore, cannot shift to the skew adjustment operation. When the recording data enable gate S402 becomes "H", the start flag S403 is outputted through the AND circuit 402, whereby the waveform generation circuit 11 shifts to the skew adjustment operation.

When the start flag S403 is outputted, the 1-shot pulse generation circuit 401 is also reset, and the 1-shot pulse generation circuit output S401 is not outputted.

As described above, according to the second embodiment, the reference clock is continuously inputted to the waveform generation circuit 11, and the phase difference between the signals in the transmission path from the transmission path 12 to the waveform synthesis circuit 6 are monitored periodically. In the state where there is no data input and no waveform generation is carried out, when the phase difference becomes larger than a predetermined value, offset control is performed on the selector control circuits 9-1~9-k. Therefore, the phase difference in transmission path 12 is automatically and periodically corrected, whereby the skew can be reduced quickly.

In this second embodiment, the two-lines-of-skew-differences discrimination means in the phase difference detection circuit is constituted by the AND circuits 301, 301, the OR circuit 303, the integration circuit 304, the counter 305, the A/D conversion circuit 306, and the comparison circuit 307; and the automatic start flag output means in the offset control circuit is constituted by the 1-shot pulse generation circuit 401 and the AND circuit 402. However, similar functions can he realized using other circuit elements.

What is claimed is:

1. A waveform generation apparatus for transmitting n pieces of binary-state signals, and generating a signal waveform having a multi-valued state by synthesizing the n pieces of binary-state signals, said apparatus comprising:
   a delay means comprising i pieces of unit delay circuits connected in series, and providing i kinds of delay states by deriving signals from the respective unit delay circuits;
   k pieces of selection means each selecting one delay state from among the i kinds of delay states of the delay means;
   a waveform generation means for generating n pieces of binary-state signals in the same state, or generating n pieces of binary-state signals having a shape according to recording data supplied from the outside, on the basis of the signals having the i kinds of delay states, which are outputted from the k pieces of selection means, and the recording data supplied from the outside;

a transmission means for transmitting the n pieces of binary-state signals generated by the waveform generation means;

a waveform synthesis means for generating a signal having multi-valued information from the n pieces of binary-state signals transmitted by the transmission means;

a phase difference detection means for detecting phase differences among the n pieces of binary-state signals in the same state, when the n pieces of binary-state signals in the same state are transmitted through the transmission means; and an offset control means for controlling the k pieces of selection means on the basis of phase difference information from the phase difference detection means, and adding offset values to target delays, thereby to eliminate the phase differences among the signals in the transmission means.

2. The waveform generation apparatus of claim 1, wherein said phase difference detection means comprises:
a most delayed signal detection means for detecting a signal which is transmitted most lately, from among the n pieces of binary-state signals transmitted by the transmission means;
a state storage means for storing the result of the detection by the most delayed signal detection means; and
a delay amount calculation means for calculating a difference in delay amounts between the most-lately transmitted signal stored in the state storage means and another signal.

3. The waveform generation apparatus of claim 1, wherein said waveform generation means generates the n pieces of binary-state signals on the basis of the k pieces of signals selected by the selection means, and the input data; and said offset control means comprises:
a path switching means for successively selecting all paths in the waveform generation means, through which the k pieces of signals selected by the selection means and the input data are transmitted; and
a path offset storage means for holding offset information when the path switching means selects a path.

4. The waveform generation apparatus of claim 1, wherein said offset control means comprises:
a unit delay amount calculation means for calculating a delay amount for each stage of unit-delay circuit of the delay means; and
an offset conversion means for converting the difference in delay amounts which is obtained by the phase difference detection means, into an offset value of the selection means, on the basis of the delay amount for each stage of unit delay circuit, which is obtained by the unit delay calculation means.

5. The waveform generation apparatus of claim 1 further comprising:
a clock signal generation means for generating predetermined clock signals;

wherein the waveform generation means continuously receives two clock signals generated by the clock signal generation means, and outputs the clock signals to the transmission means; and the phase difference detection means detects phase differences among the n pieces of binary-state signals in the sane state, and a phase difference between the continuously-inputted two clock signals.

6. The waveform generation apparatus as defined in claim 5, wherein said waveform generation means is provided with a waveform generation state detection means for detecting a state where there is no data input and no waveform generation should be carried out.

7. The waveform generation apparatus as defined in claim 5, wherein said offset control means is provided with a phase difference level detection means for detecting that the phase difference between the continuously-transmitted two clock signals becomes larger than a predetermined value; and when the offset control means receives a signal indicating that the state where no waveform generation should be performed is detected, from the waveform generation state detection means, and a signal indicating that the phase difference becomes larger than the predetermined value, the offset control means performs the process of adding offset values to target delays.

8. A waveform generation method for transmitting n pieces of binary-state signals, and generating a signal waveform having a multi-valued state by synthesizing the n pieces of binary-state signals, said method comprising:

a delay step of deriving signals from arbitrary number of stages of unit delay circuits which are connected in series, and outputting signals having i kinds of delay states;

a selection step of selecting predetermined delay states from among the i kinds of delay states;

a waveform generation step of generating n pieces of binary-state signals, on the basis of the signals having the predetermined delay states which are selected from among the i kinds of delay states, and data input;

a transmission step of transmitting the n pieces of binary-state signals generated in the waveform generation step, onto a transmission path;

a waveform synthesis step of generating a signal having multi-valued information, from the n pieces of binary-state signals generated in the waveform generation step and then transmitted;

a step of outputting signals in the same state as n pieces of binary-state signals;

a phase difference detection step of detecting phase differences among the n pieces of binary-state signals in the same state, when the n pieces of binary-state signals in the same state are transmitted through the transmission step; and an offset control step of controlling the number of delay stages in the delay step on the basis of phase difference information from the phase difference detection step, and adding offset values to target delays, thereby to eliminate the phase differences among the signals in the transmission step.

9. The waveform generation method of claim 8, wherein said phase difference detection step includes:

a most delayed signal detection step of detecting a signal which is transmitted most lately, from among the n pieces of binary-state signals transmitted in the transmission step;

a state storage step of storing the result of the detection in the most delayed signal detection step; and a delay amount calculation step of calculating a difference in delay amounts between the most-lately transmitted signal stored in the state storage means and another signal.

10. The waveform generation method of claim 8, wherein in said waveform generation step, the n pieces of binary-state signals are generated on the basis of k pieces of signals selected in the selection step, and the input data; and said offset control step includes;

a path switching step of successively selecting all paths in the waveform generation step, through which the k pieces of signals selected in the selection step and the input data are transmitted; and a path offset storage step of holding offset information when a path is selected in the path switching step.

11. The waveform generation method of claim 8, wherein said offset control step includes:

a unit delay amount calculation step of calculating a delay amount for each stage in the delay step; and an offset conversion step of converting the difference in delay amounts which is obtained in the phase difference detection step, into an offset value in the selection step, on the basis of the delay amount for each stage in the delay step, which is obtained in the unit delay calculation step.

12. A waveform generation method for transmitting n pieces of binary-state signals, and generating a signal waveform having a multi-valued state by synthesizing the n pieces of binary-state signals, said method comprising:

a delay step of deriving signals from arbitrary number of stages of unit delay circuits which are connected in series, and outputting signals having i kinds of delay states;

a selection step of selecting predetermined delay states from among the i kinds of delay states;

a waveform generation step of generating n pieces of binary-state signals, on the basis of the signals having the predetermined delay states which are selected from among the i kinds of delay states, and data input, and continuously transmitting two clock signals;

a transmission step of transmitting the n pieces of binary-state signals generated in the waveform is generation step, and the continuously supplied two clock signals, onto a transmission path;

a waveform synthesis step of generating a signal having multi-valued information, from the n pieces of binary-state signals generated in the waveform generation step and then transmitted;

a step of outputting signals in the same state as n pieces of binary-state signals;

a phase difference detection step of detecting phase differences among the n pieces of binary-state signals in the same state, and detecting a phase difference between the continuously supplied two clock signals, when the n pieces of binary-state signals in the same state are transmitted through the transmission step; and an offset control step of controlling the number of delay stages in the delay step on the basis of phase difference information from the phase difference detection step, and adding offset values to target delays, thereby to eliminate the phase differences among the signals in the transmission step.

13. The waveform generation method as defined in claim 12, wherein said waveform generation step includes a waveform generation state detection step of detecting a state where there is no data input and no waveform generation should be carried out.

14. The waveform generation method as defined in claim 12, wherein said offset control step includes:

a phase difference level detection step of detecting that the phase difference between the continuously-transmitted two clock signals becomes larger than a predetermined value; and an adjustment decision step of detecting the state where no waveform generation should be performed, from the waveform generation state detection step in the waveform generation step, and adjusting the n pieces of binary-state signals.

* * * * *